US006867583B2

(12) United States Patent
Mizutani et al.

(10) Patent No.: US 6,867,583 B2
(45) Date of Patent: Mar. 15, 2005

(54) DISPLACEMENT SENSOR

(75) Inventors: Akitoshi Mizutani, Okazaki (JP);
Kenji Takeda, Okazaki (JP); Masao Tokunaga, Gamagori (JP); Tsutomu Nakamura, Kariya (JP); Keiichi Yasuda, Ogaki (JP); Kimio Uchida, Kariya (JP); Hiroshi Takeyama, Obu (JP); Tetsuo Hariu, Kariya (JP)

(73) Assignees: Nippon Soken, Inc. (JP); Denso Corporation (JP)

(*) Notice: Subject to any disclaimer, the term of this patent is extended or adjusted under 35 U.S.C. 154(b) by 78 days.

(21) Appl. No.: 10/292,593

(22) Filed: Nov. 13, 2002

(65) Prior Publication Data
US 2003/0094941 A1 May 22, 2003

(30) Foreign Application Priority Data

Nov. 19, 2001 (JP) ...................................... 2001-353520
Dec. 26, 2001 (JP) ...................................... 2001-394787

(51) Int. Cl.$^7$ .............................................. G01B 7/14
(52) U.S. Cl. .............................. 324/207.24; 324/207.26
(58) Field of Search ......................... 324/207.2, 207.25, 324/207.24, 207.26, 207.11

(56) References Cited

U.S. PATENT DOCUMENTS

| 6,175,233 | B1 | * | 1/2001 | McCurley et al. | ....... 324/207.2 |
| 6,211,668 | B1 | * | 4/2001 | Duesler et al. | .......... 324/207.2 |
| 6,222,359 | B1 | * | 4/2001 | Duesler et al. | ........ 324/207.12 |
| 6,304,078 | B1 | * | 10/2001 | Jarrard et al. | ............ 324/207.2 |
| 6,586,929 | B1 | * | 7/2003 | Luetzow | ................ 324/207.24 |

* cited by examiner

Primary Examiner—Anjan K. Deb
(74) Attorney, Agent, or Firm—Nixon & Vanderhye PC

(57) ABSTRACT

A displacement sensor precisely detects displacement of a moving body in a rectilinear movement direction even if the moving body rotates. The sensor includes a detector and a magnet. The cross sectional area of the permanent magnet in a plane perpendicular to an axis, which extends in the rectilinear movement direction, varies in the direction of movement. The permanent magnet is magnetized in the rectilinear movement direction. The detector is located so that magnetic flux passes through a detection face of the detector substantially perpendicularly.

9 Claims, 15 Drawing Sheets

FIG. IA
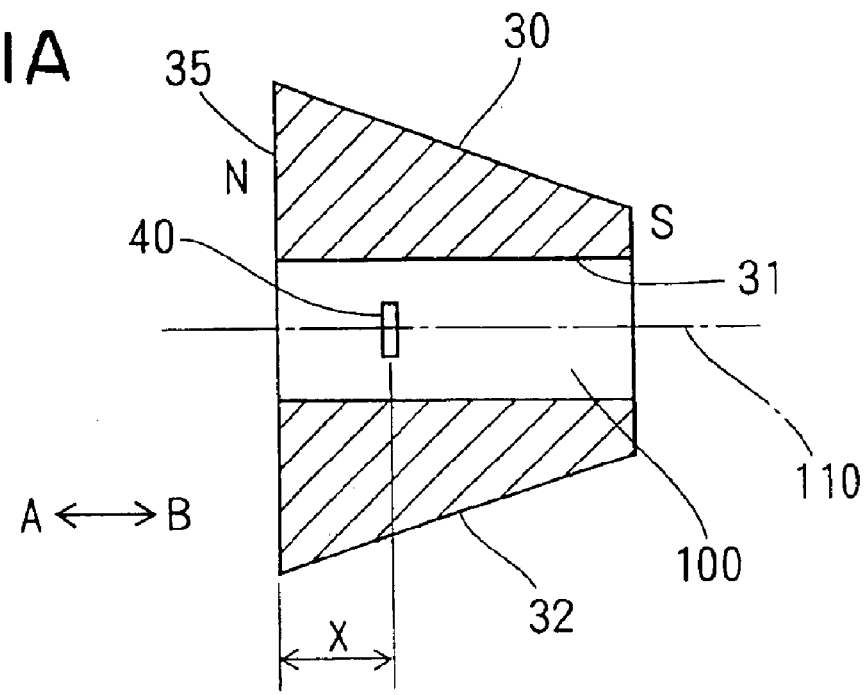
FIG. IB
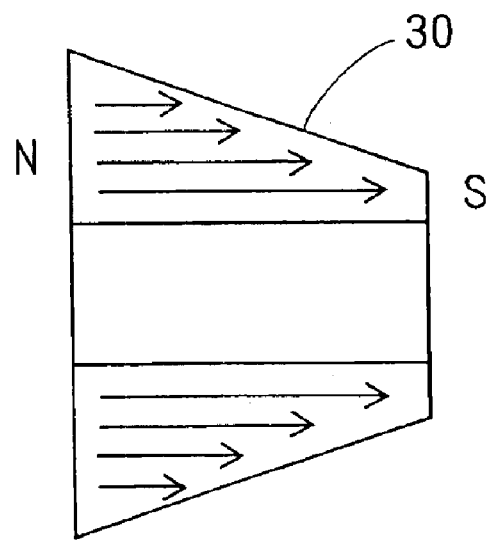

DISPLACEMENT SENSOR

CROSS REFERENCES TO RELATED APPLICATIONS

This application relates to and incorporates by reference Japanese patent application No. 2001-353520, which was filed on Nov. 19, 2001 and Japanese patent application No. 2001-394787, which was filed on Dec. 26, 2001.

BACKGROUND OF THE INVENTION

This invention relates to a noncontact-type displacement sensor for detecting displacement of a moving body undergoing rectilinear movement.

When a permanent magnet moving together with a moving body displaces relative to a magnetism-detecting device and the magnetic flux density detected by the magnetism-detecting device changes, it is possible to detect the displacement of the permanent magnet, and hence of the moving body, from a detection signal of the magnetism-detecting device. In a noncontact-type position sensor disclosed in U.S. Pat. No. 6,211,668 (which corresponds to JP-A-2000-180114), each of a pair of permanent magnets facing each other across an air gap is thinner at its center than at its ends in a movement direction. The magnets facing each other are magnetized in the same thickness direction and in opposite ways on either side of their centers, and consequently the flux density in the air gap changes in one direction from one end of the magnets to the other. The position of a magnetism-detecting device located in the air gap changes between one end of the magnets and the other, and the position sensor detects displacement of a moving body on the basis of variation in the flux density detected by the magnetism-detecting device.

However, in a position sensor of the construction disclosed in U.S. Pat. No. 6,211,668, when the angular position of the permanent magnets changes about the locus of movement of the magnetism-detecting device, which moves relative to the permanent magnets between the ends of the permanent magnets, the direction of the flux passing through the magnetism-detecting device changes. Consequently, the flux density detected by the magnetism-detecting device changes, notwithstanding that the magnetism-detecting device is not displacing relative to the permanent magnets along its locus of rectilinear movement.

Therefore, it is not possible to detect displacement in the rectilinear movement direction of a moving body that rotates while undergoing rectilinear movement. Even if the moving body is not intended to rotate, if a rotation-preventing mechanism for preventing rotation of the moving body is not used, the moving body may rotate while it moves rectilinearly. Since, to precisely detect displacement in the rectilinear movement direction of a moving body undergoing rectilinear movement, a rotation-preventing mechanism for preventing rotation of the moving body is necessary, the number of parts increases. Also, because the rotation-preventing mechanism slides against the moving body as the moving body moves, there is a risk that the moving body or the rotation-preventing mechanism will wear.

SUMMARY OF THE INVENTION

It is therefore an object of the present invention to provide a displacement sensor that detects displacement of a moving body in a rectilinear movement direction precisely, even when the moving body rotates.

It is another object of the invention to provide a displacement sensor with smaller permanent magnets and reduced weight.

To achieve these and other objects, in a displacement sensor according to a first, second or third provision of the invention, a permanent magnet has in a rectilinear movement direction a central hole in which a magnetism-detecting device can reciprocate relative to the permanent magnet in the rectilinear movement direction, and a radial dimension of the permanent magnet, measured in a direction perpendicular to the axis of the central hole, decreases in one direction of the rectilinear movement. The permanent magnet is magnetized in the rectilinear movement direction.

The flux density in the central hole decreases in one way in the rectilinear movement direction. As the position of the magnetism-detecting device in the central hole in the rectilinear movement direction changes, the flux density detected by the magnetism-detecting device changes, and consequently it is possible to detect displacement of the magnetism-detecting device in the rectilinear movement direction relative to the permanent magnet. Therefore, if the permanent magnet or the magnetism-detecting device undergoes rectilinear movement together with a moving body, it is possible to detect displacement of the moving body in the rectilinear movement direction.

Also, because the permanent magnet is magnetized in the rectilinear movement direction, even if the permanent magnet rotates relative to the magnetism-detecting device about the axis of the central hole, which is aligned with the rectilinear movement direction, the flux density detected by the magnetism-detecting device does not change. Therefore, it is possible to detect displacement of a moving body which rotates as it undergoes rectilinear movement. Also, a rotation-preventing mechanism for preventing rotation of the moving body, which normally is necessary for precisely detecting displacement in a rectilinear movement direction, even for a moving body that is not intended to rotate, becomes unnecessary. Because the number of parts is reduced, the construction of the displacement sensor becomes simple. In addition, wearing of the moving body caused by sliding against a rotation-preventing mechanism is avoided.

Moreover, because the permanent magnet used in the displacement sensor can be a single permanent magnet made by machining or molding or the like, the number of parts is reduced and the assembly of the displacement sensor is relatively simple.

In a displacement sensor according to a second provision of the invention, the diameter of an inner circumferential face forming the central hole is substantially uniform, and the diameter of an outer circumferential face of the permanent magnet decreases in one direction of the rectilinear movement.

In a displacement sensor according to a third provision of the invention, the diameter of an inner circumferential face of the permanent magnet forming the central hole decreases in one direction of the rectilinear movement, and the diameter of an outer circumferential face of the permanent magnet is substantially uniform.

In either of these cases, when the permanent magnet is made by machining, because it is only necessary for the permanent magnet to be cut rectilinearly, the machining of the permanent magnet is relatively easy.

In a displacement sensor according to a fourth provision of the invention, the central hole is a through hole, and consequently machining the central hole is easy.

When the central hole is made a through hole, the absolute value of the rate of change of the flux density in the central hole falls in the vicinity of the thicker end of the permanent magnet. Displacement of the magnetism-detecting device relative to the permanent magnet in the rectilinear movement direction, i.e., displacement of the moving body, is detected in a range over which the flux density in the central hole changes in proportion with the displacement. When the central hole is made a through hole, because the absolute value of the rate of increase of the flux density in the central hole falls in the vicinity of the large end, the flux density ceases to change in proportion with the displacement. Consequently, the range over which displacement can be detected is narrowed.

To solve this problem, in a displacement sensor according to a fifth provision of the invention, the rate of increase in the thickness of the permanent magnet in a radial direction, perpendicular to the axis of the central hole, is made to increase toward the larger end. Thus, falling of the absolute value of the rate of increase of the flux density in the central hole in the vicinity of the larger end can be prevented. Because the flux density changes in proportion with the displacement in the vicinity of the large end, the range over which displacement can be detected increases.

If the central hole is made a through hole, the flux orients in the radial direction in the vicinities of the ends of the central hole, and the flux does not pass through the detection face of the magnetism-detecting device perpendicularly. As a result, the absolute value of the rate of increase of the flux density detected by the magnetism-detecting device decreases. A displacement sensor according to a sixth provision of the invention has a magnetic member covering one end of the through hole. The flux in the vicinity of the end of the through hole where the magnetic member is located passes through the magnetic member and flows substantially parallel to the axis of the central hole. That is, the flux passes through the detection face of the magnetism-detecting device substantially perpendicularly, and consequently, the absolute value of the rate of increase of the flux density in the vicinity of this end of the through hole is prevented from falling. In the vicinity of the end of the through hole where the magnetic member is provided the flux density changes in proportion with the displacement, and thus the range over which displacement can be detected increases.

In a displacement sensor according to a seventh provision of the invention, a permanent magnet which undergoes rectilinear movement relative to a magnetism-detecting device has a central hole in which the magnetism-detecting device can reciprocate in the rectilinear movement direction relative to the permanent magnet. Also, the radial dimension of the permanent magnet decreases in the rectilinear movement direction from each end of the permanent magnet toward its center, and the permanent magnet is magnetized in the rectilinear movement direction in opposite directions on either side of its center. Because the direction of the flux reverses at the center of the permanent magnet, the polarity of the magnetic flux detection signal of the magnetism-detecting device inverts. On the basis of the variation in magnitude of and the direction of the flux density detected by the magnetism-detecting device, it is possible to detect displacement. For the same resolution and the same displacement detection range, compared to a construction in which the radial dimension of the permanent magnet decreases in only one direction in the rectilinear movement direction, the permanent magnet is smaller.

In a displacement sensor according to an eighth provision of the invention, a permanent magnet according to the seventh provision is made of two permanent magnet members joined together at a center location. Consequently, the permanent magnet can be constructed easily.

In a displacement sensor according to a ninth provision of the invention, a permanent magnet is formed to extend in the direction in which a magnetism-detecting device undergoes rectilinear movement relative to the permanent magnet. The cross-sectional area of the permanent magnet decreases in one direction of the rectilinear movement, and the permanent magnet is magnetized in the rectilinear movement direction.

Consequently, over the length of the permanent magnet in the rectilinear movement direction, the flux density on the axis decreases in one direction of the rectilinear movement. As the position of the magnetism-detecting device in the rectilinear movement direction changes, the flux density detected by the magnetism-detecting device changes, and therefore it is possible to detect displacement of the magnetism-detecting device relative to the permanent magnet in the rectilinear movement direction. Thus, if either the permanent magnet or the magnetism-detecting device undergoes rectilinear movement together with a moving body, it is possible to detect displacement of the moving body in the rectilinear movement direction.

Also, because the permanent magnet is magnetized in the rectilinear movement direction, even if the permanent magnet rotates relative to the magnetism-detecting device about an axis of movement that extends in the rectilinear movement direction, the flux density detected by the magnetism-detecting device does not change. Consequently, it is possible to detect displacement of a moving body that rotates as it undergoes rectilinear movement. In addition, a rotation-preventing mechanism for preventing rotation of the moving body, which normally is necessary for precisely detecting displacement in a rectilinear movement direction even of a moving body which is not intended to rotate, becomes unnecessary. Besides, because the number of parts is reduced, the construction of the displacement sensor becomes simple. Also, wearing of the moving body caused by sliding against a rotation-preventing mechanism is avoided.

Furthermore, because the permanent magnet used in the displacement sensor can be a single permanent magnet made by machining or molding or the like, the number of parts is reduced and the assembly of the displacement sensor is easy.

Moreover, because it is not necessary for the permanent magnet to be tubular and surround the magnetism-detecting device, the permanent magnet can be made small and light.

In a displacement sensor according to a tenth or twentieth provision of the invention, permanent magnets are located circumferentially about the axis. Because the flux density around the magnetism-detecting device increases as the number of permanent magnets increases, the detection sensitivity of the magnetism-detecting device improves.

In a displacement sensor according to an eleventh or twenty-first provision of the invention, permanent magnets are located in pairs diametrically opposed across the axis. Because the flux density distribution between permanent magnets located diametrically opposed is substantially uniform, even if the position of the magnetism-detecting device deviates between the permanent magnets in a direction perpendicular to the axis, the flux density detected by the magnetism-detecting device does not change. Therefore, errors in the mounting of the permanent magnets or the magnetism-detecting device, or deviation of the relative position of the magnetism-detecting device between the permanent magnets when the magnetism-detecting device undergoes rectilinear movement relative to the permanent magnets, can be absorbed.

In a displacement sensor according to a twelfth or twenty-second provision of the invention, a magnetic member magnetically connects together corresponding end faces of the permanent magnets. The flux in the vicinity of the end faces of the permanent magnets where the magnetic member is provided passes through the magnetic member and flows approximately parallel with the axis. That is, the flux passes through the detection face of the magnetism-detecting device substantially perpendicularly, and consequently the absolute value of the rate of increase of the flux density in the vicinity of the end faces where the magnetic member is provided is prevented from falling. In the vicinity of the end faces where the magnetic member is provided the flux density changes in proportion with the displacement, and thus the range over which displacement can be detected becomes wider.

In a displacement sensor according to a thirteenth, fifteenth, sixteenth or twenty-third provision of the invention, the permanent magnet is generally planar and its thickness is substantially uniform, and consequently it is easy to form the permanent magnet.

In a displacement sensor according to a fourteenth or twenty-fourth provision of the invention, the thickness of the permanent magnet is greater than the width of the magnetic flux density detection part of the magnetism-detecting device in the thickness direction of the permanent magnet, and consequently even if the position of the magnetic flux density detection part deviates within the thickness of the permanent magnet, the detected flux density does not change.

Displacement of the magnetism-detecting device relative to the permanent magnet in the rectilinear movement direction, and hence displacement of the moving body, is detected in a range over which the flux density on the axis changes in proportion with the displacement. The absolute value of the rate of change of the flux density on the axis falls in the vicinity of the end at which the difference between the distance from the axis to the outer face of the permanent magnet and the distance from the axis to the inner face of the permanent magnet is larger, and the flux density on the axis in the vicinity of the end at which the difference between the distance from the axis to the outer face of the permanent magnet and the distance from the axis to the inner face of the permanent magnet is larger ceases to change in proportion with the displacement. Consequently, the range over which displacement can be detected is narrowed.

To solve this problem, in a displacement sensor according to a seventeenth provision of the invention, the rate of increase of the difference between the distance from the axis to the outer face of the permanent magnet and the distance from the axis to the inner face is made to increase toward the end at which that difference is larger. That is, falling of the absolute value of the rate of increase of the flux density in the vicinity of the end at which the difference between the distance from the axis to the outer face of the permanent magnet and the distance from the axis to the inner face is larger can be prevented. Because the flux density changes in proportion with the displacement in the vicinity of the end where the difference between the distance from the axis to the outer face of the permanent magnet and the distance from the axis to the inner face is larger, the range over which displacement can be detected becomes wider.

In a displacement sensor according to an eighteenth provision of the invention, a cross-sectional area, which is perpendicular to an axis of movement that passes through the center of a magnetism-detecting device and which extends in the direction in which the magnetism-detecting device and a permanent magnet experience relative rectilinear movement, the cross-sectional area of the permanent magnet varies in the rectilinear movement direction.

In a displacement sensor according to a nineteenth provision of the invention, a permanent magnet according to the eighteenth provision is made up of two permanent magnet members joined together at a center location. Consequently, the permanent magnet can be constructed easily.

BRIEF DESCRIPTION OF THE DRAWINGS

FIG. 1A is a sectional view showing a permanent magnet and a Hall IC of a displacement sensor of a first preferred embodiment of the invention;

FIG. 1B is a view illustrating the direction of magnetization of the permanent magnet;

DETAILED DESCRIPTION OF THE PREFERRED EMBODIMENTS

A number of preferred embodiments of the invention will now be described, on the basis of the accompanying drawings.

Figure 2:
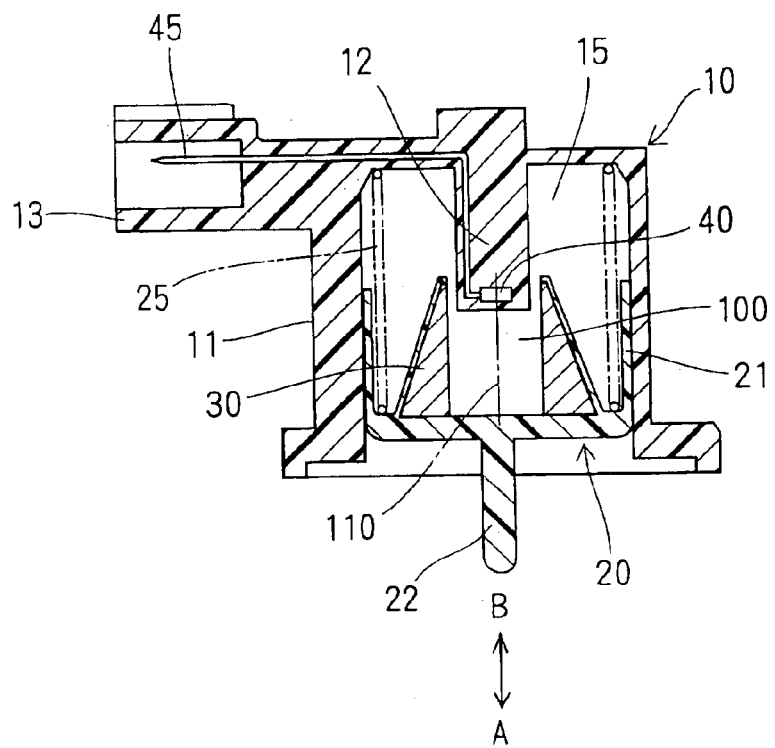
FIG. 2 is a sectional view of the displacement sensor of FIG. 1A.

A first preferred embodiment of a displacement sensor 10 according to the invention is shown in FIG. 2. The displacement sensor 10 is located for example on an EGR (Exhaust Gas Recirculation) valve for varying a flow of recirculated exhaust gas in an automotive vehicle, and by a rod of this sensor being joined to or contacted with a shaft of the EGR valve, the sensor detects a flow of recirculated gas, that is, displacement of the shaft of the EGR valve.

A resin housing 11 of the displacement sensor 10 is shaped like a cylindrical cup and fixed to the EGR valve. The housing 11 has a cylindrical projection 12 projecting from the inside of its base toward a permanent magnet 30, which will be further discussed later. A Hall IC 40 serving as a magnetism-detecting device is insert-molded in the end of the cylindrical projection 12, and a terminal 45 for taking out a detection signal from the Hall IC 40 is insert-molded in a connector part 13 of the housing 11.

A movable member 20 made of resin has a cylindrical part 21 and a rod 22. The cylindrical part 21 is received in a receiving cylinder 15 of the housing 11 and can reciprocate rectilinearly in the direction of arrows A and B in FIG. 2. The rod 22 is joined to or contacts the end of a shaft of the EGR valve, and consequently, the movable member 20 moves rectilinearly together with the shaft of the EGR valve. The permanent magnet 30 is insert-molded in the movable member 20. A spring 25, which serves as an urging means, urges the movable member 20 toward the shaft of the EGR valve.

Next, the construction of the permanent magnet 30 will be described in detail. As shown in FIG. 1A, the permanent magnet 30 has, as a cylindrical hole, a through hole 100 provided in the direction of the arrows A, B in which it undergoes rectilinear movement together with the shaft of the EGR valve. The cylindrical projection 12, in which the Hall IC 40 is insert-molded, is movable in a straight line through the through hole 100 relative to the permanent magnet 30. In FIGS. 1A and 1B, the housing 11 and the movable member 20 are not shown.

The diameter of the inner circumferential face 31 of the permanent magnet 30 forming the through hole 100 is substantially uniform in the rectilinear movement direction. The diameter of the outer circumferential face 32 of the permanent magnet 30, on the other hand, decreases rectilinearly in the direction of arrow B, which is one direction of the rectilinear movement. Consequently, the radial dimension of the permanent magnet 30, which is measured perpendicularly to the axis 110 of the through hole 100 and to the rectilinear movement direction of the permanent magnet 30, decreases in the direction of arrow B. The permanent magnet 30 is formed in the shape of a truncated cone having a cylindrical through hole 100 passing through it in the direction of the axis 110. That is, the cross-section of the permanent magnet 30, perpendicular to the axis 110, is annular, and the area of this cross-section decreases in the direction of the arrow B. As shown in FIG. 1B, the permanent magnet 30 is magnetized in one direction of the rectilinear movement, from its large end toward its smaller end, as indicated by arrows in FIG. 1B.

The Hall IC 40 is located so that magnetic flux flowing through the through hole 100 in the direction of arrow B passes through a detection face of the Hall IC 40 substantially perpendicularly. The Hall IC 40 has a Hall device and a control circuit for controlling a detection signal from the Hall device. In the first preferred embodiment, a Hall IC 40 having a Hall device and a control circuit for controlling the detection signal from the Hall device is used as a magnetism-detecting device referred to in the claims of the present invention. However, alternatively, the Hall device and the control circuit may be separated and just a Hall device may be insert-molded in the cylindrical projection 12 as the magnetism-detecting device. Or, an MRE device may alternatively be used as the magnetism-detecting device.

Figure 3:
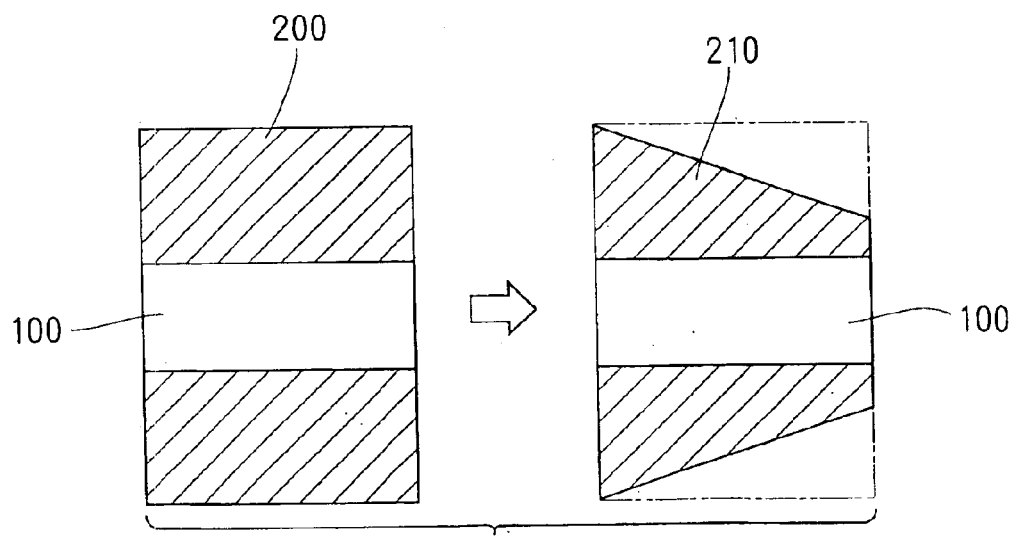
FIG. 3 is a sectional view illustrating machining of a permanent magnet of the sensor of FIG. 1A.

A method for manufacturing the permanent magnet 30 is shown in FIG. 3. The stages of the method are as follows:

(1) A prismatic, magnetic member 200 having a through hole 100 is machined to form a shaped member 210, which has the shape of a truncated cone. Alternatively, the through hole 100 may be formed after the magnetic member 200 is machined. Alternatively, instead of machining, a mold may be made and the shaped member 210 may be molded. Further, the shaped member 210 may be molded with resin by sintering.

Figure 4:
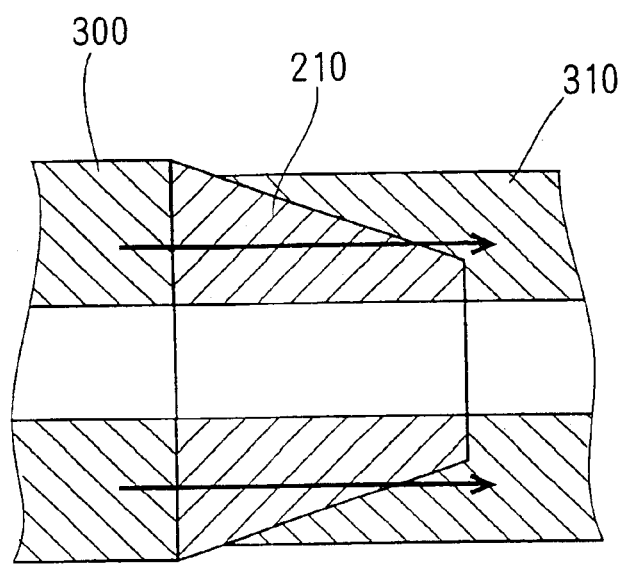
FIG. 4 is a sectional view illustrating magnetization of the permanent magnet of the sensor of FIG. 1A.

(2) Next, as shown in FIG. 4, magnetizing jigs 300, 310 matching the shapes of the ends of the shaped member 210 are brought into abutment with the ends of the shaped member 210, and the shaped member 210 is magnetized in the direction of the arrows to form the permanent magnet 30.

Alternatively, prismatic, magnetic member 200 having a through hole 100 may be magnetized first and then machined to form the shaped member 210 in the shape of a truncated cone thereafter.

Figure 5:
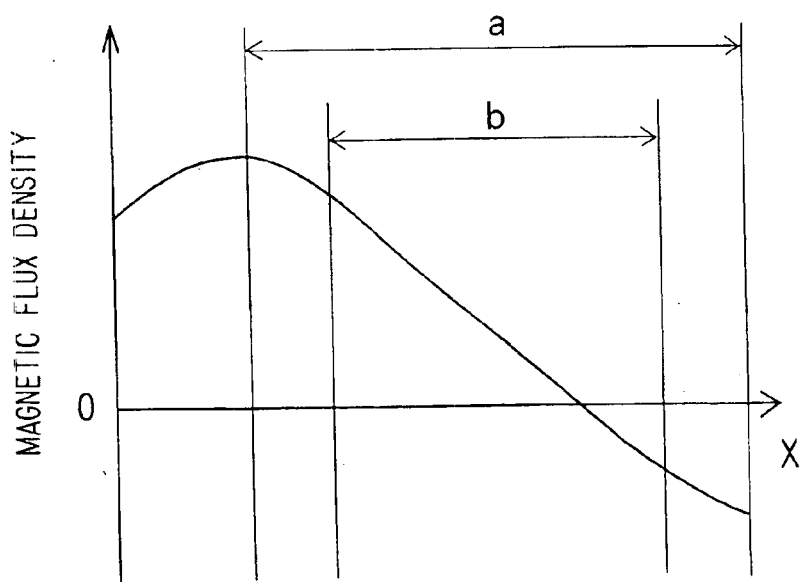
FIG. 5 is a graph showing a relationship between displacement and flux density in the embodiment of FIG. 1A.

When the displacement of the Hall IC 40 from the end face 35 at the N-polarity end of the permanent magnet 30, which is the large end, is written X, the relationship between the displacement X and the flux density in the through hole 100, including the direction of the flux, is as shown in FIG. 5. The Hall IC 40 outputs a detection signal, the voltage which changes in correspondence with the flux density. Range a in FIG. 5 is a range over which the arrangement can be used as a displacement sensor. From the point of view of the linearity of the detection voltage, it is desirable for the arrangement to be used within the range b.

Figure 6:
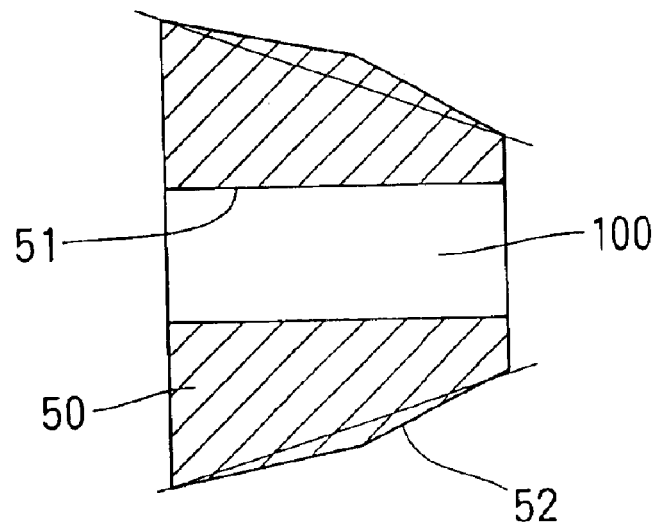
FIG. 6 is a sectional view showing a further embodiment of the sensor.
Figure 8:
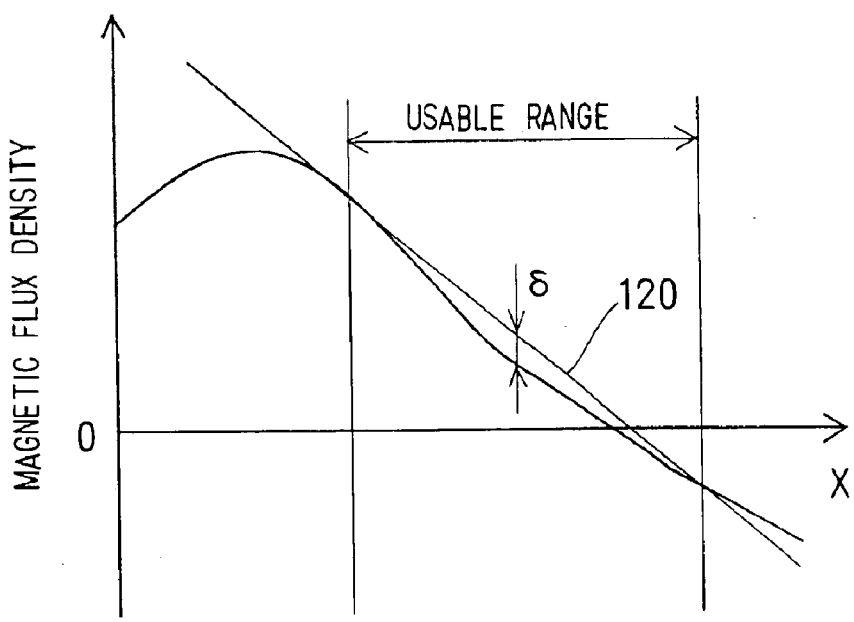
FIG. 8 is a graph showing a deviation in the relationship between displacement and flux density in the sensor of FIG. 1A.

When in the relationship between the displacement X and the flux density the linearity is poor and there is a deviation δ, as shown in FIG. 8, it is possible to improve this linearity by giving the outer circumferential face 52 a projecting shape which corresponds with the deviation δ, as in permanent magnet 50 of FIG. 6. If the projecting or indented shape of the outer circumferential face 52 of the permanent magnet 50 is set in correspondence with the size and the sign (plus or minus) of the deviation δ, which is the amount of deviation from the straight line 120 shown in FIG. 8, the linearity of the relationship between the displacement X and the flux density improves. The inner circumferential face 51 has a uniform diameter.

Figure 7:
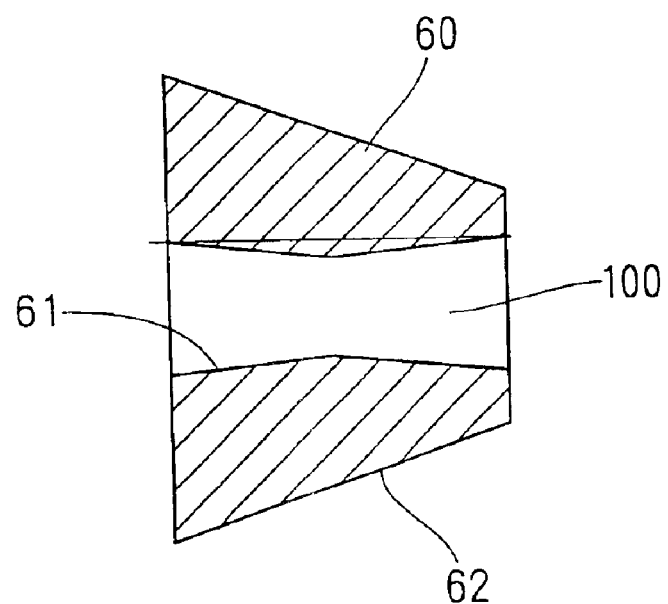
FIG. 7 is a sectional view showing a further embodiment of the sensor.

As in a permanent magnet 60 of another variation shown in FIG. 7, linearity can be achieved by making the inner circumferential face 61 projecting in correspondence with the deviation δ, instead of the outer circumferential face 62. As described above, the inner circumferential face 61 does not have to project inward.

In the first preferred embodiment, the permanent magnet 30 was magnetized in the rectilinear movement direction from the larger end of the permanent magnet 30 toward the smaller end. However, alternatively, the permanent magnet 30 may be magnetized in the rectilinear movement direction from the smaller end of the permanent magnet 30 toward the larger end. In this case, the relationship between the displacement X and the flux density becomes as shown in FIG. 5, but with the direction of the flux density reversed.

Figure 9:
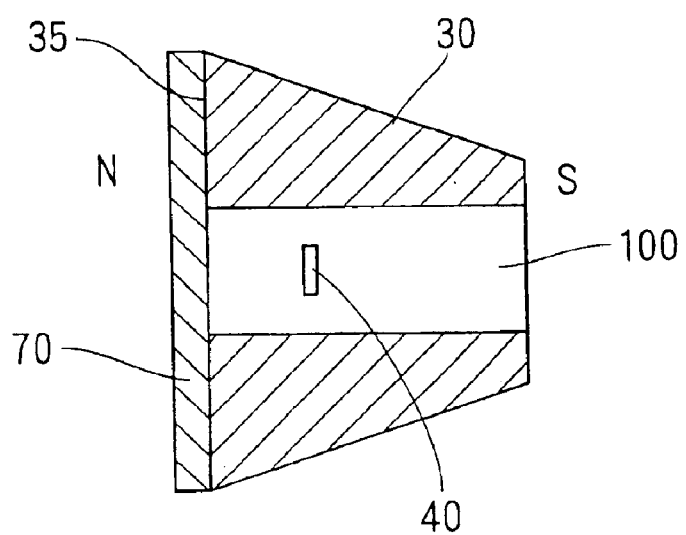
FIG. 9 is a sectional view showing a displacement sensor of a further preferred embodiment of the invention.

A further preferred embodiment of the invention is shown in FIG. 9. Parts essentially the same as in the previous preferred embodiments have been given the same reference numerals.

Figure 10:
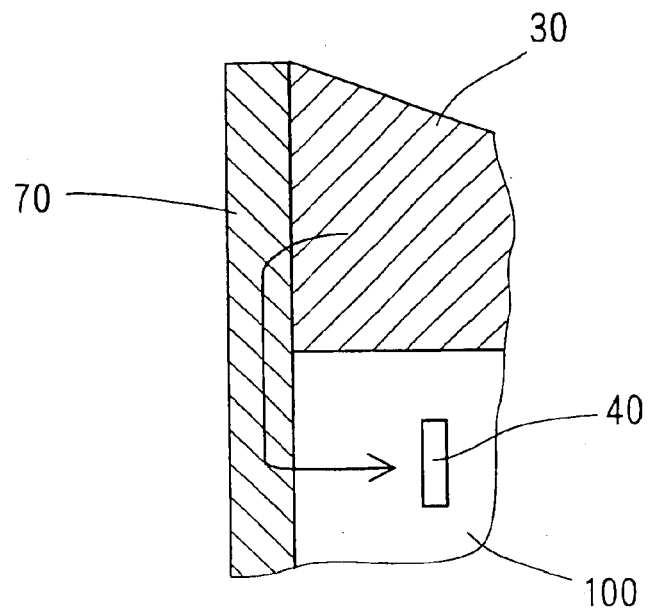
FIG. 10 is a sectional view showing a principal portion of the sensor of FIG. 9.
Figure 11:
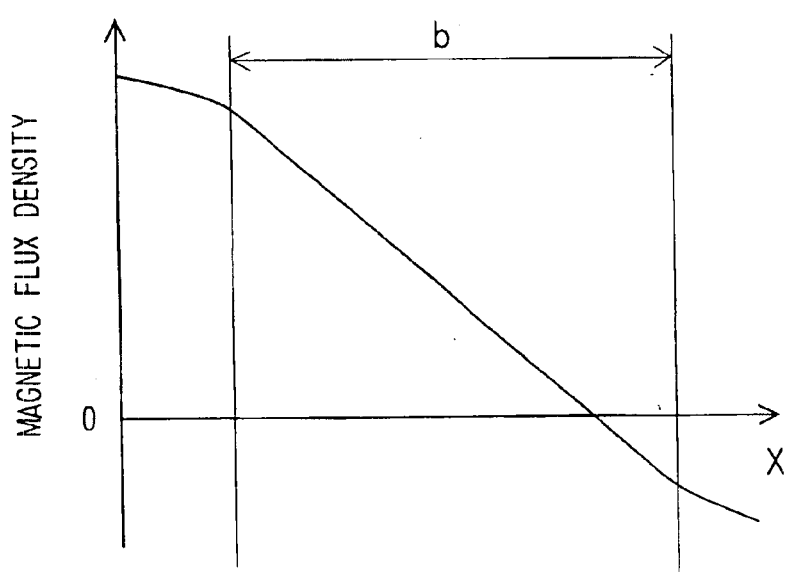
FIG. 11 is a graph showing the relationship between displacement and flux density for the sensor of FIG. 9.

A magnetic plate 70 is fixed as a magnetic member by bonding or the like to the end face 35 of the large end of the permanent magnet 30. Magnetic flux, extending from the end face 35, passes through the magnetic plate 70 and, as shown in FIG. 10, passes through the detection face of the Hall IC 40 substantially perpendicularly. Consequently, the absolute value of the rate of increase of the flux density detected by the Hall IC 40 in the vicinity of the end face 35, where the permanent magnet 30 is thick, increases. Accordingly, the section b over which linearity between the displacement X and the flux density is maintained becomes wider than in the first preferred embodiment.

Figure 12:
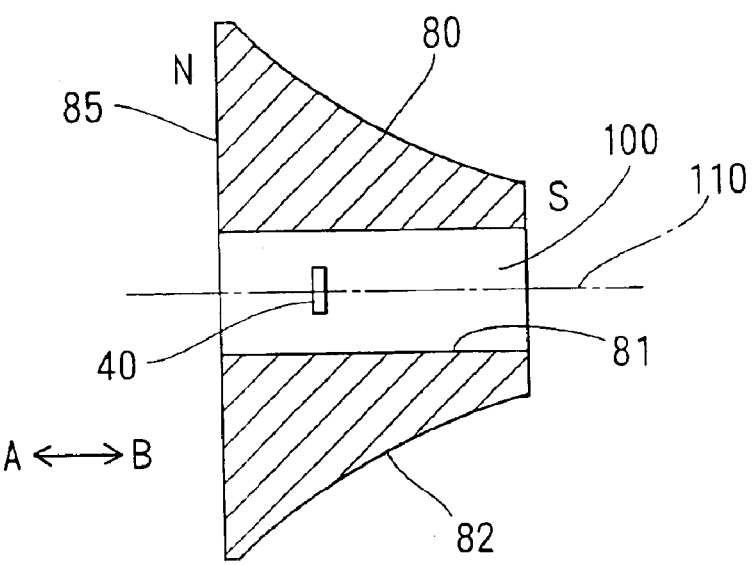
FIG. 12 is a sectional view showing a displacement sensor of a further preferred embodiment of the invention.

A further preferred embodiment of the invention is shown in FIG. 12. Parts essentially the same as in the first preferred embodiment have been given the same reference numerals.

The diameter of the inner circumferential face 81 forming the through hole 100 in the permanent magnet 80 is uniform in the rectilinear movement direction. The outer circumferential face 82 of the permanent magnet 80 is a concave curved surface, and the rate of increase of the diameter of the outer circumferential face 82 increases in the direction of arrow A shown in FIG. 12, that is, toward the larger end. Consequently, the rate of increase of the thickness of the permanent magnet 80 in the radial direction, perpendicular to the axis 110, increases in the direction of arrow A shown in FIG. 12, that is, toward the large end.

The greater the dimension of the permanent magnet 80 at a given position, the greater the flux density is at that position. Accordingly, in the vicinity of the end face 85 of the large end of the permanent magnet 80, the magnetic flux detected by the Hall IC 40 increases. Consequently, the section over which linearity between the displacement X and the flux density is maintained becomes wider.

Figure 13:
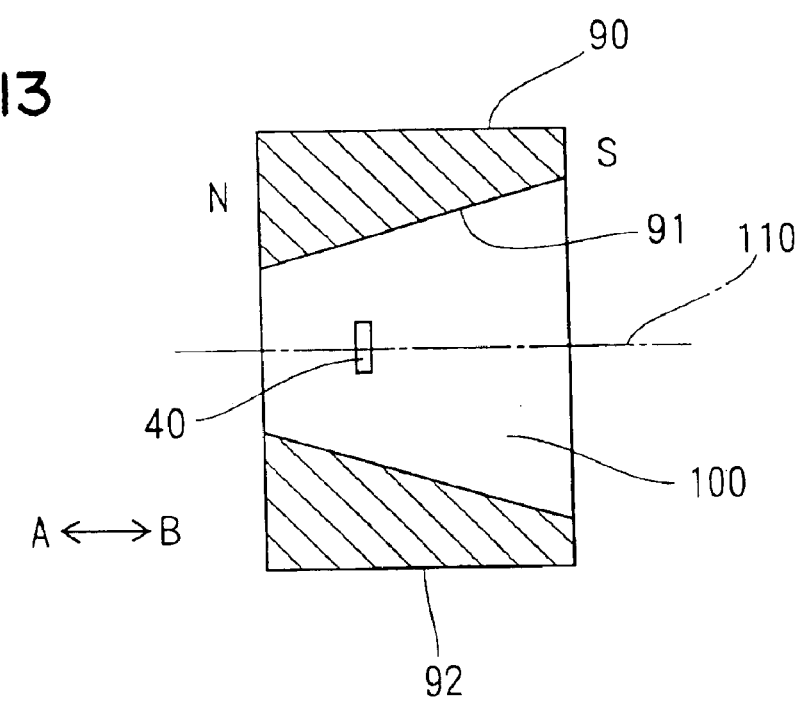
FIG. 13 is a sectional view showing a displacement sensor of a further preferred embodiment of the invention.

A further preferred embodiment of the invention is shown in FIG. 13. Parts essentially the same as in the first preferred embodiment have been given the same reference numerals.

The diameter of the inner circumferential face 91 of the permanent magnet 90 forming the through hole 100 is decreased rectilinearly in the direction of arrow A, which is one way in the rectilinear movement direction. The diameter of the outer circumferential face 92 of the permanent magnet 90 is substantially uniform in the rectilinear movement direction. As in the first preferred embodiment, the thickness of the permanent magnet 90 in the radial direction, perpendicular to the axis 110, decreases rectilinearly in the direction of arrow B, and the permanent magnet 90 is magnetized in the rectilinear movement direction. Consequently, the relationship between the displacement X and the flux density is substantially the same characteristic as in the first preferred embodiment.

Figure 14:
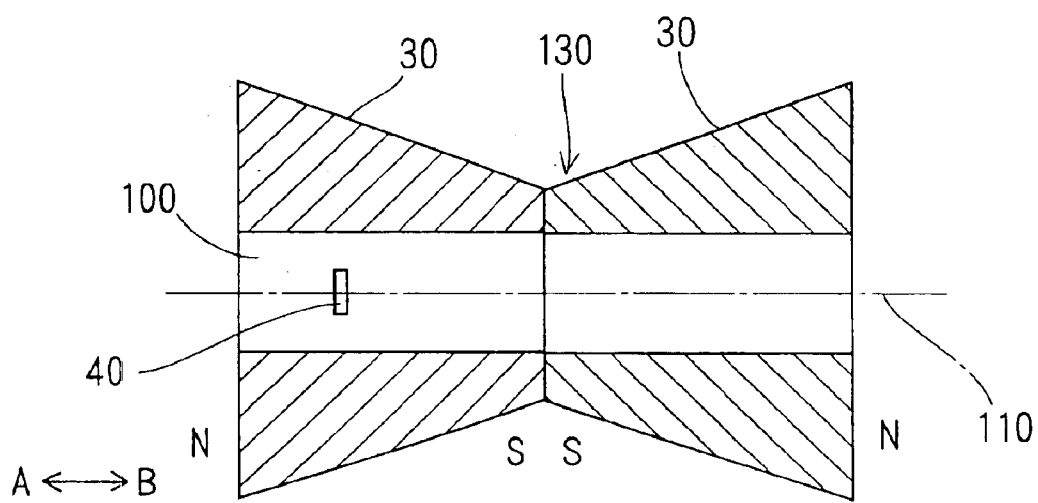
FIG. 14 is a sectional view showing a displacement sensor of a further preferred embodiment of the invention.

A further preferred embodiment of the invention is shown in FIG. 14. Parts essentially the same as in the first preferred embodiment have been given the same reference numerals.

A permanent magnet 130 consists of two permanent magnets 30 of the kind described in the first preferred embodiment, fixed together at the faces of their smaller ends by bonding or the like. The thickness of the permanent magnet 130 in the radial direction, perpendicular to the axis 110, decreases from either end to the center in the rectilinear movement direction, and the magnetization inverts in direction at the center.

Figure 15:
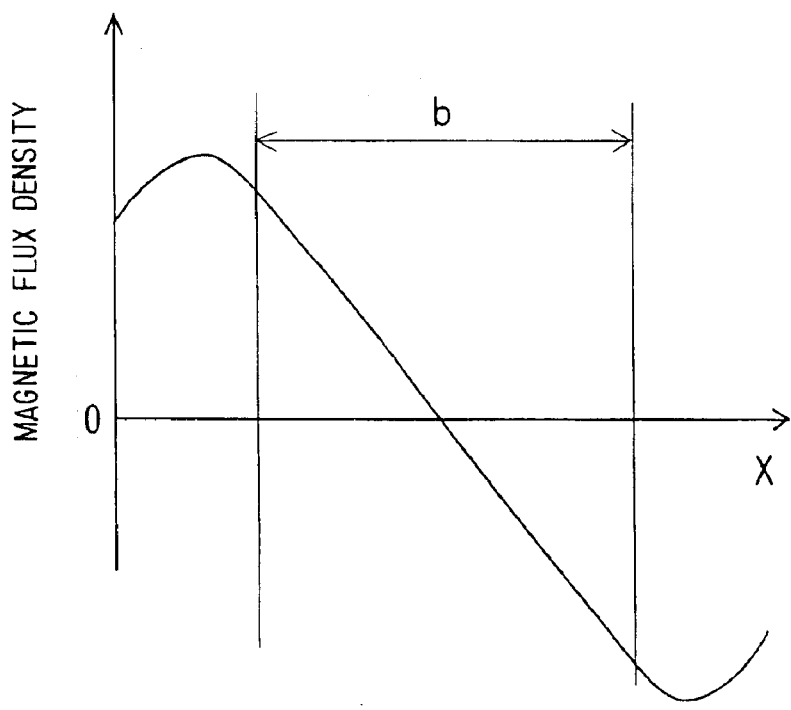
FIG. 15 is a graph showing the relationship between displacement and flux density for the sensor of FIG. 14.

As shown in FIG. 15, the flux density in the through hole 100 of the permanent magnet 130 decreases from the end face 35 of the left side permanent magnet toward the center, inverts in direction at the center, and increases toward the end face 35 of the right side permanent magnet. Consequently, compared to the first preferred embodiment, the section b over which linearity between the displacement X and the flux density is maintained becomes about two times.

If a permanent magnet having the same section b and the same resolution as the sensor of FIG. 14 was made with its thickness decreasing in only one direction of the rectilinear movement as in the first embodiment, the diameter of the permanent magnet would be approximately double that of the permanent magnet 130. Accordingly, for the sensor of FIG. 14, the range b over which the linearity of the displacement X and the flux density is maintained can be enlarged without the diameter of the permanent magnet being made large.

Although in the sensor of FIG. 14, the permanent magnet 130 was made by joining together two permanent magnets 30, alternatively, a single permanent magnet 130 may be made by machining from one base member. In this case, the left side and the right side of the center are magnetized separately.

In the sensors of FIGS. 1–14, the permanent magnets have a through hole through which a Hall IC 40 can reciprocate in a rectilinear movement direction relative to the permanent magnet. Also, the thickness of the permanent magnet in the radial direction, perpendicular to the axis, which is aligned with the rectilinear movement direction, decreases in one direction of the rectilinear movement. Because a permanent magnet of this construction is magnetized in the rectilinear movement direction, that is, the direction of the axis 110, even if the permanent magnet rotates about the axis 110 relative to the Hall IC 40, the magnetic flux detected by the Hall IC 40 and the direction of this flux does not change. Therefore, the displacement of a moving body which rotates as it undergoes rectilinear movement can be detected with high precision. Also, a rotation-preventing mechanism for preventing rotation of the moving body, which would normally be necessary for precisely detecting the displacement in a rectilinear movement direction, even of a moving body which is not intended to rotate, is unnecessary. Because the number of parts is reduced, the structure of the sensor is simple. In addition, wear of the moving body caused by the moving body sliding against a rotation-preventing mechanism is avoided.

In the sensors of FIGS. 1–14, a through hole is formed in the permanent magnet. Alternatively, a cylindrical hole with one end in the rectilinear movement direction blocked may be formed in a single permanent magnet by machining or molding or the like. In this case, as in the embodiment of FIG. 9, the magnetic flux flowing through the cylindrical hole at the blocked end becomes substantially parallel with the axis, and because the direction of the flux passing through the detection face of the Hall IC 40 approaches perpendicular, a fall in the rate of increase of the magnetic flux density detected by the Hall IC 40 can be prevented.

Figure 16:
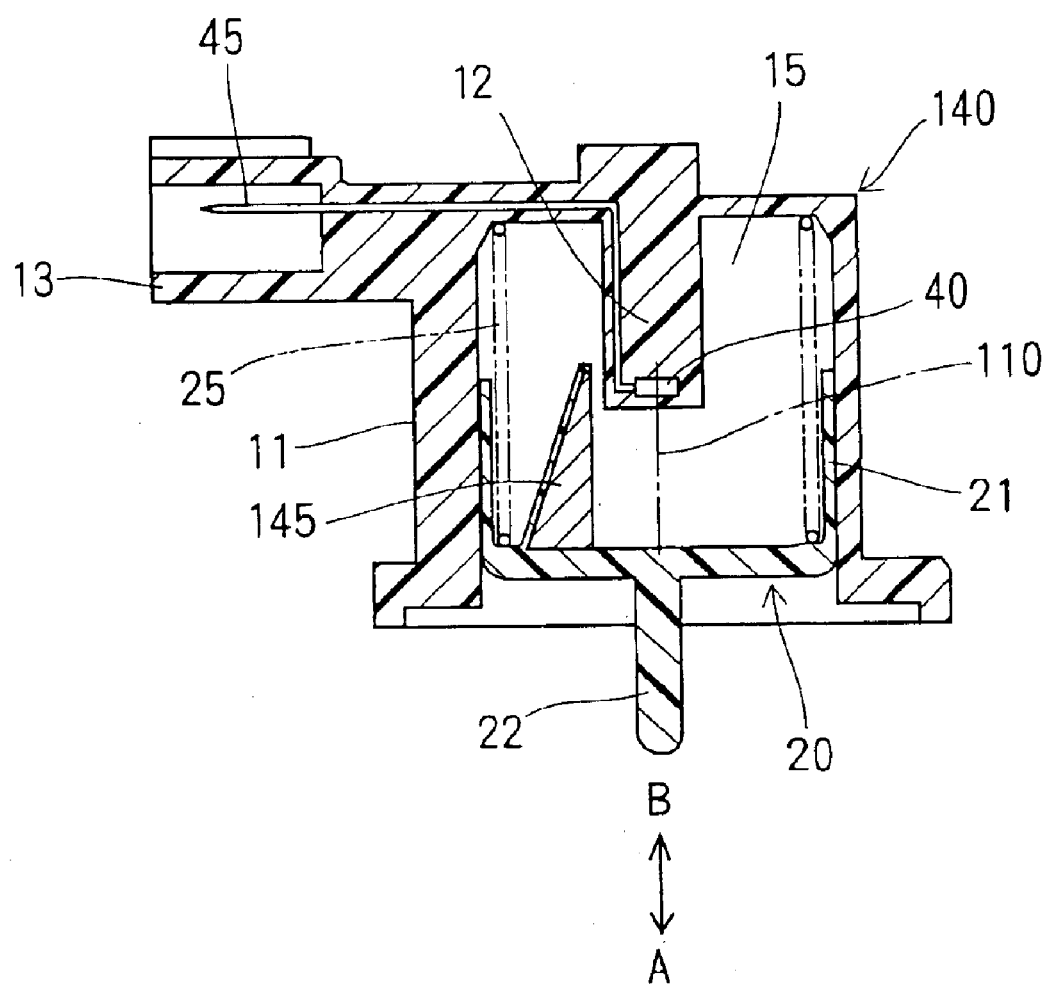
FIG. 16 is a sectional view showing a displacement sensor of a further preferred embodiment of the invention.

A displacement sensor according to a further preferred embodiment of the invention is shown in FIG. 16. In the displacement sensor 140 of this embodiment, a plate-shaped permanent magnet 145 is used instead of the tubular permanent magnet 30 of the first embodiment. The construction of the sensor of this embodiment, apart from the permanent magnet 145, is essentially the same as that of the first embodiment, and parts that are the same or similar have been assigned the same reference numerals.

Figure 17A:
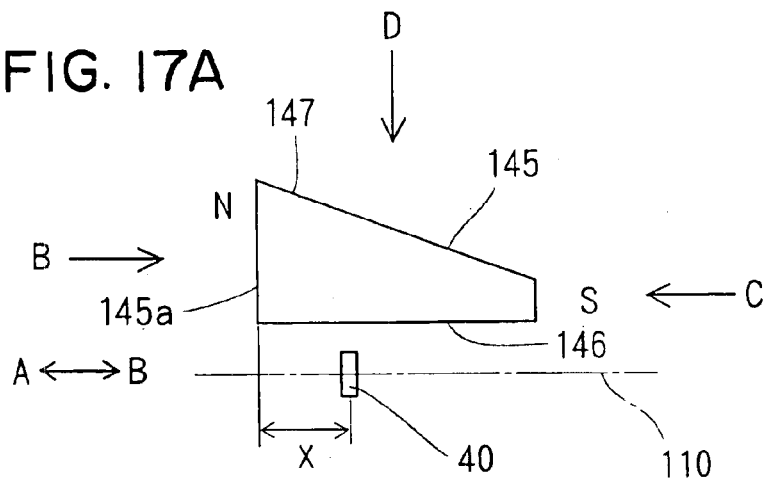
FIG. 17A is a side view of a permanent magnet and a Hall IC of the displacement sensor of FIG. 16.
Figures 17B, 17C:
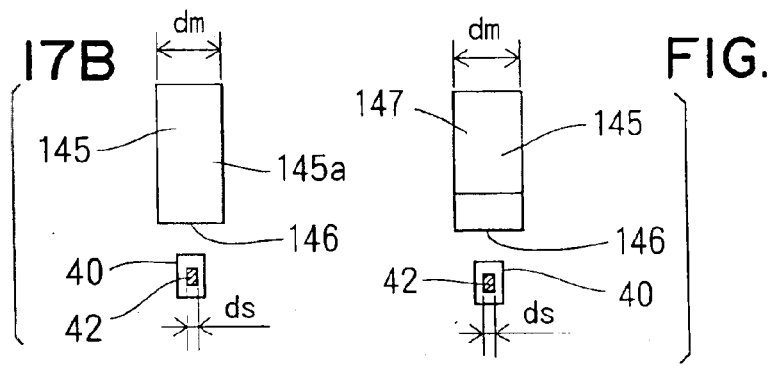
FIG. 17B is a view in the direction of arrow B of FIG. 17A.
FIG. 17C is a view in the arrow C direction of FIG. 17A.
Figure 17D:
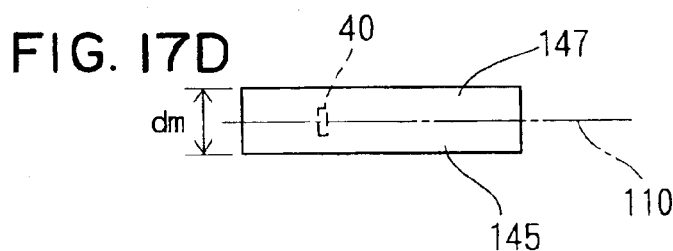
FIG. 17D is a view in the arrow D direction of FIG. 17A.

As shown in FIGS. 17A–17D, the permanent magnet 145 is formed in the shape of a plate extending in the directions of the arrows A and B, which indicate the movement of the sensor and an EGR valve shaft. The cylindrical projection 12 (see FIG. 16), in which the Hall IC 40 is insert-molded, reciprocates relative to the permanent magnet 145 on an axis 110, which is located inward of the permanent magnet 145. The axis 110 passes through the center of the Hall IC 40 in the direction in which the Hall IC 40 undergoes rectilinear movement relative to the permanent magnet 145. The permanent magnet 145 rotates about the axis 110. In FIGS. 17A through 17C, the housing 11 and the movable member 20 have been omitted.

The distance of the inner face 146 of the permanent magnet 145 from the axis 110 is approximately uniform in the rectilinear movement direction. The distance of the outer face 147 of the permanent magnet 145 from the axis 110 decreases in the direction of arrow B, which is one direction of the rectilinear movement. Accordingly, in a cross-section perpendicular to the axis 110, the difference between the distance from the axis 110 to the outer face 147 and the distance from the axis 110 to the inner face 146 decreases in the direction of arrow B. That is, in a cross-section perpendicular to the axis 110, the cross-sectional area of the permanent magnet 145 decreases in one direction of the rectilinear movement. The permanent magnet 145 is magnetized in one direction of the rectilinear movement, in the direction from the end at which the difference between the distance from the axis 110 to the outer face 147 and the distance from the axis 110 to the inner face 146 is larger toward the end at which the difference is smaller.

The permanent magnet 145 is formed in the shape of a plate having a thickness $d_m$, which is substantially uniform in the radial direction. The thickness $d_m$ of the permanent magnet 145, or the lateral dimension, is greater than the corresponding dimension $d_s$ of the flux density detecting part 42 of the Hall IC 40. As a result, even if the position of the Hall IC 40 with respect to the permanent magnet 145 deviates in the lateral direction of the permanent magnet 145, the flux density detected by the flux density detecting part 42 of the Hall IC 40 remains the same.

Figure 18:
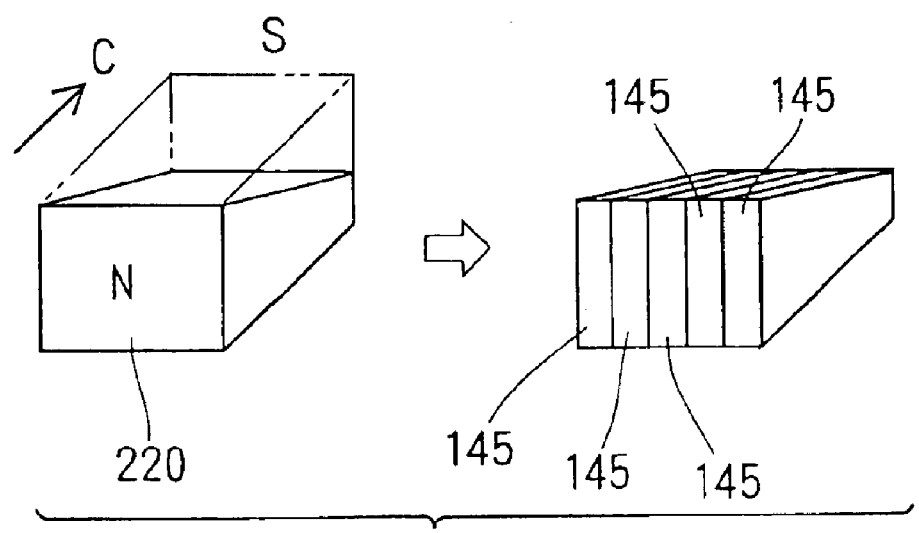
FIG. 18 is a view illustrating manufacturing stages of the permanent magnet of the displacement sensor of FIG. 16.
Figure 19:
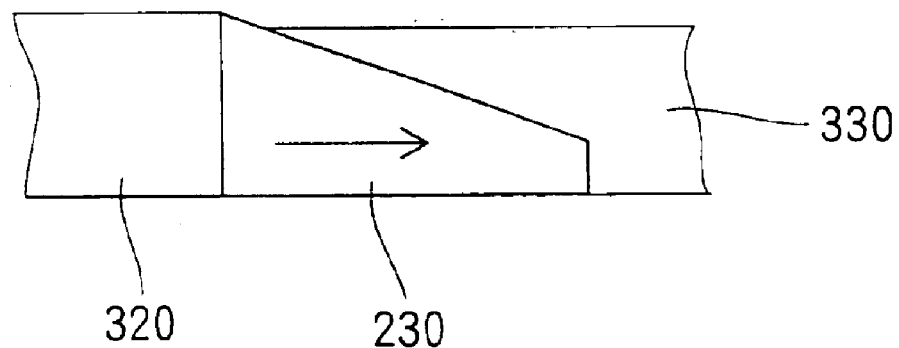
FIG. 19 is a sectional view illustrating magnetization of the permanent magnet of the displacement sensor of FIG. 16.

A method for manufacturing the permanent magnet 145 is shown in FIG. 18 and FIG. 19. As shown in FIG. 18, a magnetic base material 220 in the shape of a rectangular parallelepiped, which is magnetized in the direction of arrow C, is machined and then cut to a predetermined thickness to form permanent magnets 145.

Or, as shown in FIG. 19, a magnetic base material 230 is pre-molded to the shape of a permanent magnet 145, magnetizing jigs 320, 330 matched to the shapes of the ends of the magnetic base material 230 are abutted with both ends of the magnetic base material 230, and the magnetic base material 230 is magnetized in the direction of the arrow to form a permanent magnet 145.

If the displacement X of the Hall IC 40 from the end face 145a of the N-pole end of the permanent magnet 145, which is the end at which the difference between the distance from the axis 110 to the outer face 147 and the distance from the axis 110 to the inner face 146 is large, is defined as X, then the displacement X and the flux density on the axis 110, including the direction of the flux, have the same relationship as that described in the first preferred embodiment and shown in FIG. 5.

When the relationship between the displacement X and the flux density is as shown in FIG. 8, which was discussed in connection with the first preferred embodiment, is non-linear and there is a deviation $\delta$, the linearity can be improved, or corrected, by causing the outer face 152 to project in correspondence with the deviation $\delta$, as in the permanent magnet 150 shown in FIG. 20. If the projecting or indented shape of the outer face 152 of the permanent magnet 150 is set in correspondence with the size and the direction of the deviation $\delta$, which is measured from a straight line 120 shown in FIG. 8, the relationship between the displacement X and the flux density will be substantially linear. The distance from the axis 110 to the inner face 151 is approximately uniform in the rectilinear movement direction.

Figure 21:
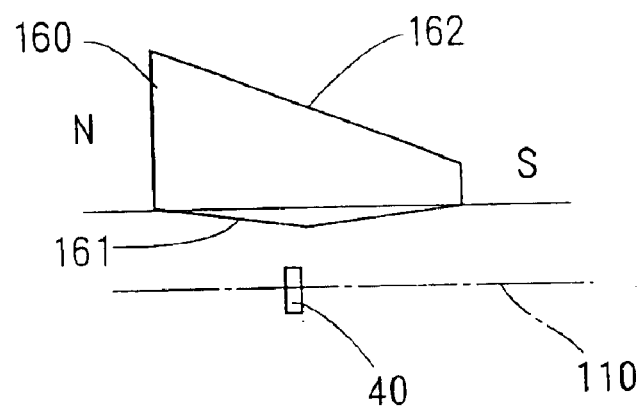
FIG. 21 is a side view of a further embodiment, which is similar to the sensor of FIG. 16.

In a permanent magnet 160 of a further variation shown in FIG. 21, linearity can be achieved by making the inner face 161 project in correspondence with the deviation $\delta$, instead of the outer face 162. As described above, the shape of the inner face 161 does not have to be projecting.

In the sensor of FIG. 16, the permanent magnet 145 was magnetized in the direction from the end at which the difference between the distance from the axis 110 to the outer face 147 and the distance from the axis 110 to the inner face 146 is large to the end at which it is small. Alternatively, the permanent magnet 145 may be magnetized in the opposite direction. In this case, the relationship between the displacement X and the flux density is the same as that shown in FIG. 5, but with the direction of the flux density reversed.

Figure 22:
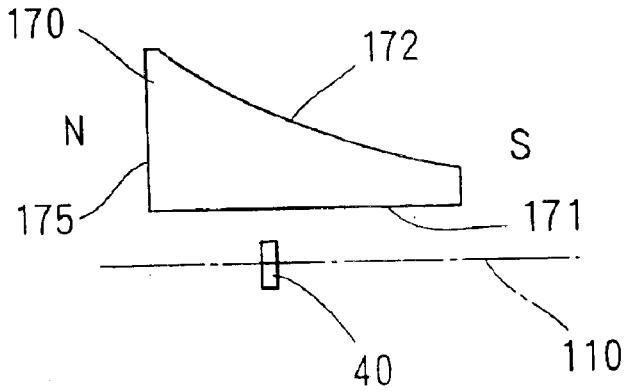
FIG. 22 is a side view of a displacement sensor of a further preferred embodiment of the invention.

A displacement sensor according to a further preferred embodiment of the invention is shown in FIG. 22. Parts essentially the same as those of the sensor of FIG. 16 have been given the same reference numerals.

The distance from the inner face 171 of the permanent magnet 170 to the axis 110 is approximately uniform in the movement direction. The distance from the outer face 172 of the permanent magnet 170 to the axis 110 decreases in the direction of arrow B, which is one direction of the rectilinear movement. The rate of increase of the difference between the distance from the axis 110 to the outer face 172 and the distance from the axis 110 to the inner face 171 increases toward the end at which the difference is large. That is, the outer face 172 is a concave curved surface, and in a cross-section perpendicular to the axis 110, the cross-sectional area of the permanent magnet 170 decreases in one direction of the rectilinear movement. The permanent magnet 170 is magnetized one way in the rectilinear movement direction, from the end at which the difference between the distance from the axis 110 to the outer face 172 and the distance from the axis 110 to the inner face 171 is large to the end at which it is small.

The greater the difference between the distance from the axis 110 to the outer face 172 and the distance from the axis 110 to the inner face 171 at a given position, the greater the flux density at that position is. Therefore, the flux density detected by the Hall IC 40 is higher in the vicinity of the end face 175 at which the difference between the distance from the axis 110 to the outer face 172 and the distance from the axis 110 to the inner face 171 is large. Consequently, the range over which the linearity of the displacement X and the flux density is maintained is wider.

Figure 23A:
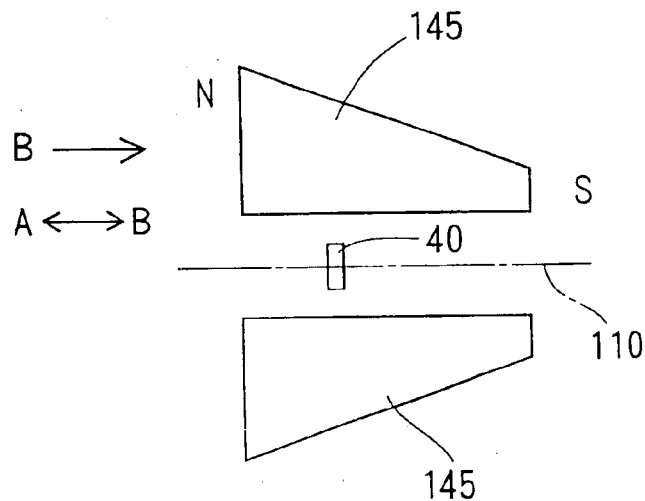
FIG. 23A is a side view showing a displacement sensor of a further preferred embodiment of the invention.
Figure 23B:
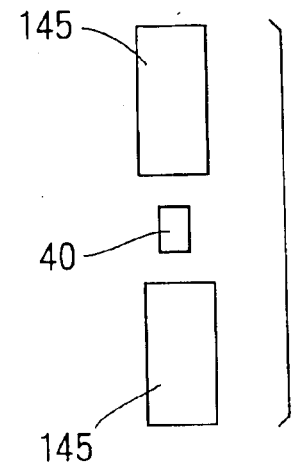
FIG. 23B is a view in the direction of arrow B of FIG. 23A.

A displacement sensor according to a further preferred embodiment of the invention is shown in FIGS. 23A and 23B. Parts essentially the same as those of the sensor of FIG. 16 have been assigned the same reference numerals.

The displacement sensor of this embodiment has two permanent magnets 145. The permanent magnets 145 are located diametrically opposite each other with respect to the axis 110. Because the flux density distribution between the opposed permanent magnets 145 is uniform, even if the position of the Hall IC 40 deviates in a direction perpendicular to the axis 110 between the permanent magnets 145, the flux density detected by the Hall IC 40 does not change. Therefore, errors in the mounting of the permanent magnet 145 or the Hall IC 40, or deviation of the relative position of the Hall IC 40 between the permanent magnets 145 when the Hall IC 40 undergoes rectilinear movement relative to the permanent magnets 145, can be accommodated.

In addition, the flux density on the axis 110 becomes larger than when there is only one permanent magnet 145. Consequently, the detection sensitivity of the Hall IC 40 increases.

Figure 20:
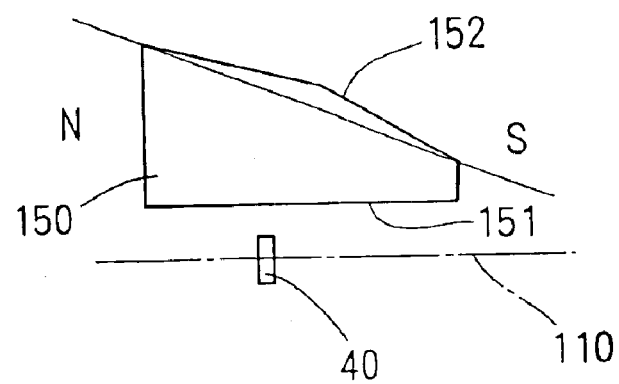
FIG. 20 is a side view of a further embodiment, which is similar to the sensor of FIG. 16.

In this embodiment, permanent magnets of the shape shown in the embodiment of FIG. 16 were used, but alternatively, permanent magnets of the shape shown in the sensors of FIG. 20 through FIG. 22 may be used.

Figure 24A:
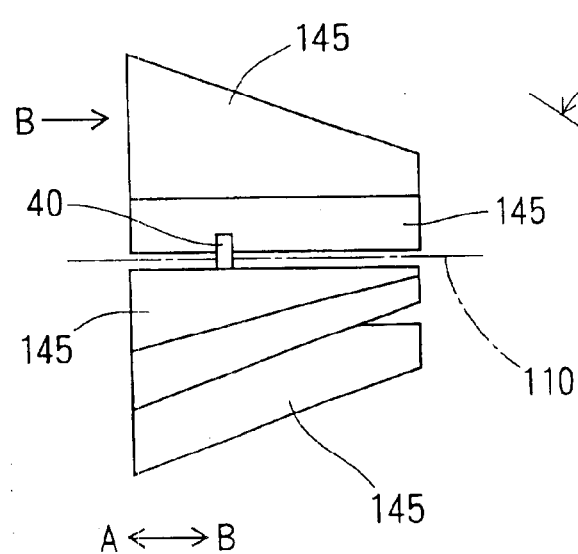
FIG. 24A is a side view showing a displacement sensor of a further preferred embodiment of the invention.
Figure 24B:
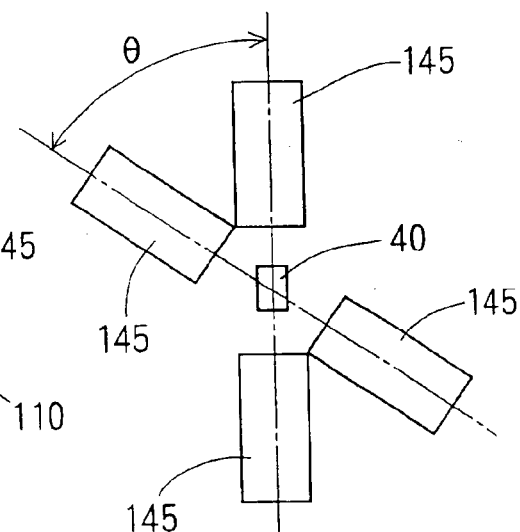
FIG. 24B is a view in the direction of arrow B of FIG. 24A.

A displacement sensor according to a further preferred embodiment of the invention is shown in FIGS. 24A and 24B. Parts essentially the same as those of the embodiment of FIG. 16 have been assigned the same reference numerals.

The displacement sensor of this embodiment has two pairs of permanent magnets 145 diametrically opposed across the axis 110. The pairs are spaced apart by an angle represented by the symbol θ (θ is sixty degrees in this embodiment) about the axis 110. The flux density in the area enclosed by the inner faces of the four permanent magnets 145 is uniform. The flux density on the axis 110 is greater in comparison to a sensor in which there is only one permanent magnet 145. Consequently, the detection sensitivity of the Hall IC 40 is greater. The angular spacing of the pairs of diametrically opposed permanent magnets 145 does not have to be sixty degrees.

In the embodiments of FIGS. 23A–24B, permanent magnets 145 are diametrically opposite each other across the axis 110. Alternatively, the flux density on the axis 110 can be increased by placing multiple permanent magnets 145 circumferentially about the axis 110 but not in diametrically opposite pairs. Again, this increases the detection sensitivity of the Hall IC 40.

In this embodiment, permanent magnets of the shape shown in the embodiment of FIG. 16 were used, but alternatively, permanent magnets of the shape shown in FIG. 20 through FIG. 22 may be used.

Figure 25:
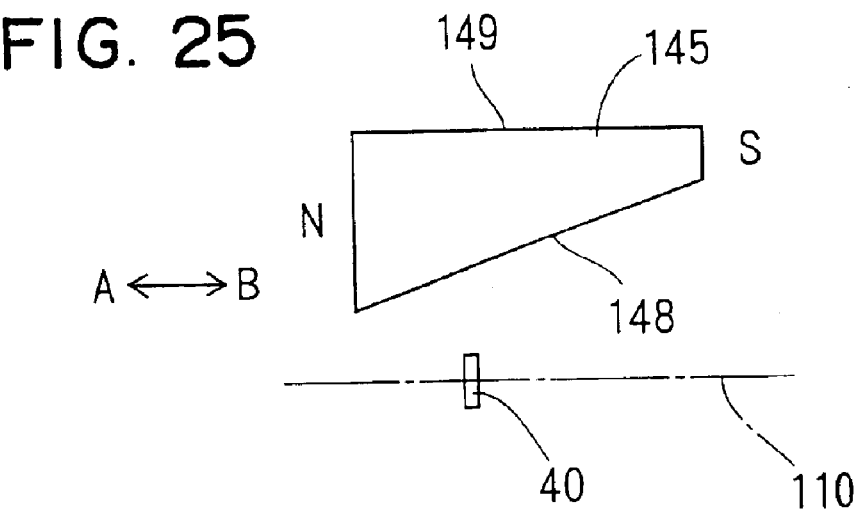
FIG. 25 is a side view of a displacement sensor of a further preferred embodiment of the invention.

A displacement sensor according to a further preferred embodiment of the invention is shown in FIG. 25. Parts essentially the same as those of the embodiment of FIG. 16 have been assigned the same reference numerals.

The permanent magnet 145 of this embodiment is a permanent magnet 145 that has been inverted with respect to that of the embodiment of FIG. 16. The distance from the inner face 148 of the permanent magnet 145 to the axis 110 increases in the direction of arrow B, which is one direction of the rectilinear movement. The distance from the outer face 149 of the permanent magnet 145 to the axis 110 is approximately uniform in the movement direction.

Figure 26:
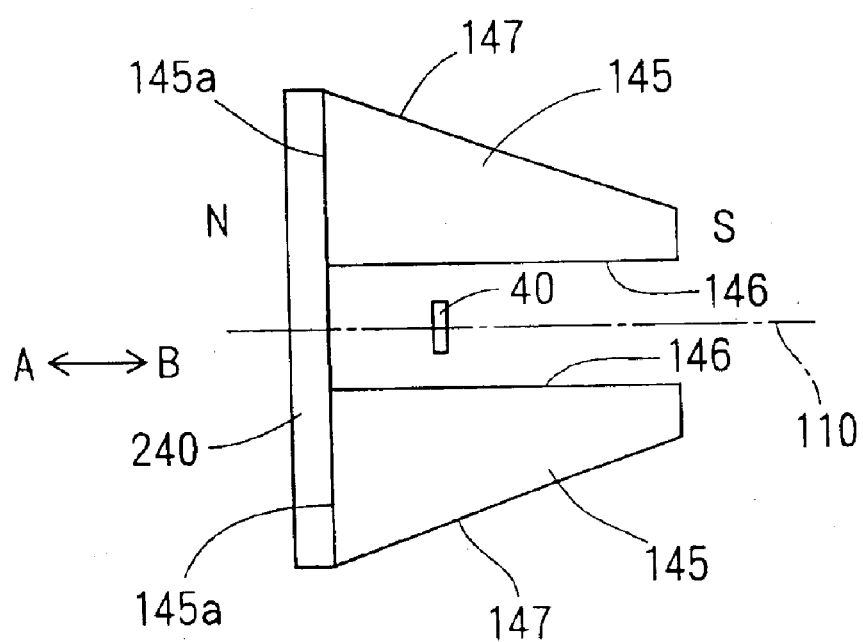
FIG. 26 is a side view of a displacement sensor of a further preferred embodiment of the invention.

A displacement sensor according to a further preferred embodiment of the invention is shown in FIG. 26. Parts essentially the same as those of the embodiment of FIG. 16 have been assigned the same reference numerals.

Permanent magnets 145 of a pair are located diametrically opposite each other across an axis 110, and the end faces 145a of the large ends of the permanent magnets 145 are magnetically connected by a rectangular magnetic plate 240, which is a magnetic member that is fixed to the magnets 145 by bonding or the like. Flux extending from the end face 145a passes through the magnetic plate 240 and passes through the detection face of the Hall IC 40 substantially perpendicularly. Consequently, the absolute value of the rate of increase of the flux density detected by the Hall IC 40 in the vicinity of the large end faces 145a of the permanent magnets 145 increases. Accordingly, the range over which the linearity of the displacement X and the flux density is maintained is wider than that of the embodiment of FIG. 16.

Figure 27:
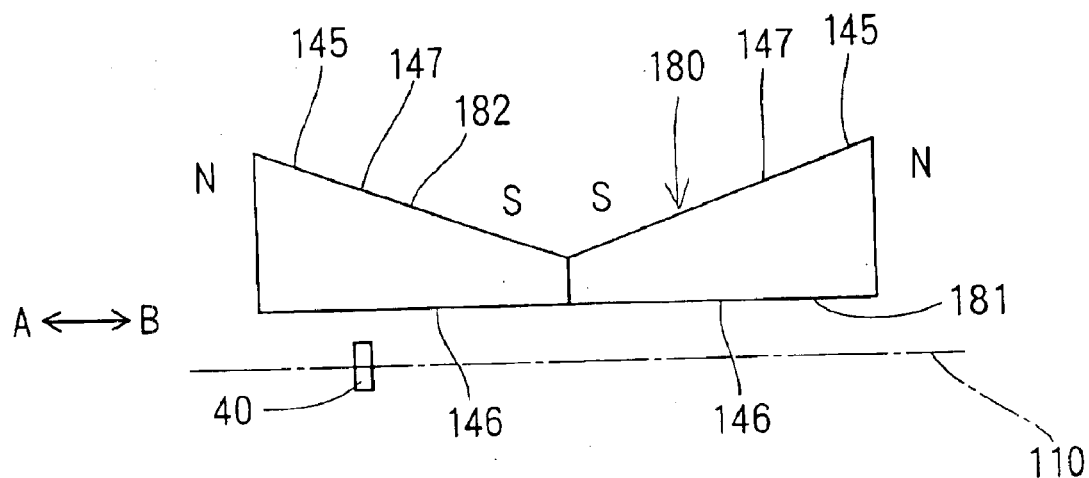
FIG. 27 is a side view of a displacement sensor of a twelfth preferred embodiment of the invention.

A further preferred embodiment is shown in FIG. 27. Parts essentially the same as in the embodiment of FIG. 16 have been assigned the same reference numerals.

A permanent magnet 180 consists of two permanent magnets 145 of the kind described in the embodiment of FIG. 16. The magnets are fixed together by bonding or the like at the small end faces. The distance from the axis 110 to the inner face 181 of the permanent magnet 180 is substantially uniform in the movement direction. The distance from the axis 110 to the outer face 182 of the permanent magnet 180 decreases from the ends of the magnets toward the center. The permanent magnet 180 is magnetized in the movement direction in opposite directions on either side of the center.

As in the embodiment of FIG. 15, the range b over which the linearity of the displacement X and the flux density on the axis 110 is maintained is approximately twice that of the embodiment of FIG. 16.

If a permanent magnet having the same range b and the same resolution as the embodiment of FIG. 27 was made with its cross-sectional area decreasing in only one direction of the rectilinear movement, as in the embodiment of FIG. 16, the difference between the distance from the axis 110 of the permanent magnet to the outer face and the distance from the axis 110 to the inner face would be approximately double that of the sensor of FIG. 27. Accordingly, with this embodiment, the range b over which the linearity of the displacement X and the flux density is maintained is relatively great without the distance from the axis 110 to the outer face 182 of the permanent magnet 180 being made longer.

Although in the embodiment of FIG. 27, the permanent magnet 180 is made by joining together two permanent magnets 145, alternatively, the single permanent magnet 180 may be made by machining or the like from one base member. In this case, the left side and the right side of the center are magnetized separately.

Figure 28:
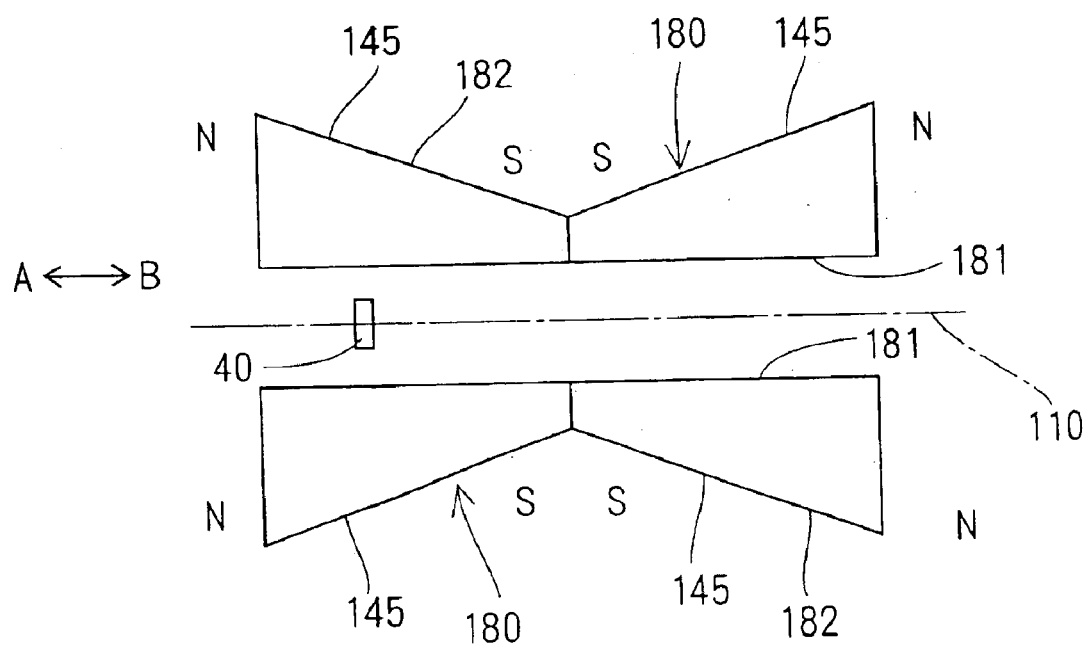
FIG. 28 is a side view of a displacement sensor of yet a further preferred embodiment of the invention.

A further preferred embodiment of the invention is shown in FIG. 28. Parts essentially the same as those of the embodiment of FIG. 27 have been assigned the same reference numerals.

Two permanent magnets 180 are diametrically opposite each other across the axis 110. Therefore, compared to the embodiment of FIG. 27, in which there is only one permanent magnet 180, the flux density on the axis 110 is greater. Consequently, the detection sensitivity of the Hall IC 40 is greater.

The positions of a plurality of permanent magnets 180 located circumferentially about the axis 110 do not have to be diametrically opposite. By placing multiple permanent magnets 180 circumferentially about the axis 110, it is possible to raise the flux density on the axis 110 and increase the detection sensitivity of the Hall IC 40.

In the embodiments of FIGS. 16–28 described above, the permanent magnets are formed as a flat plates extending in the movement direction of the Hall IC 40. In a cross-section perpendicular to the axis 110, the cross-sectional area of the permanent magnet decreases either in one direction of the movement or from the ends of the magnet toward its center. Because a permanent magnet of this construction is magnetized in the movement direction, i.e., in the direction of the axis 110, even if the permanent magnet rotates relative to the Hall IC 40 about the axis 110, the flux density and the direction of the flux detected by the Hall IC 40 do not change. Therefore, the displacement of a moving body which rotates as it undergoes rectilinear movement can be detected with high precision. Also, a rotation-preventing mechanism for preventing rotation of a moving body, which would normally be necessary for precisely detecting the displacement in a rectilinear movement direction even of a moving body which is not intended to rotate, is unnecessary. Because the number of parts is reduced, the structure of the sensor becomes simple. Moreover wear of the moving body caused by the moving body sliding against a rotation-preventing mechanism is avoided.

Furthermore, because the permanent magnet is formed as a flat plate, the volume of the permanent magnet is small. Consequently, the permanent magnet can be made small and light.

In the embodiments of FIGS. 16–28, the magnets were made as flat plates. However, the shape of the permanent magnet is not so limited, and as long as the cross-sectional area of the permanent magnet in a cross-section perpendicular to the axis 110 decreases either in one direction of the rectilinear movement or from the ends of the magnet toward its center, the shape of the permanent magnet may alternatively be that of a truncated pyramid or a truncated cone.

In the illustrated embodiments, the permanent magnet or magnets move together with the moving body, and the Hall IC 40 is fixed. However, constructions are also possible in which the Hall IC 40 moves rectilinearly together with the moving body, and the permanent magnet is fixed.

What is claimed is:

1. A displacement sensor comprising:
   a magnetism-detecting device; and
   a permanent magnet, wherein the permanent magnet has an axial, central hole, at least one end of which is open, and the magnetism-detecting device or the magnet can move relative to the other in the direction of the axis of the hole together with a moving body, and the magnetism-detecting device detects displacement of the moving body in the axial direction, wherein a radial dimension of the permanent magnet, which is measured in a direction perpendicular to the axis, decreases in one direction of the axial movement, and the permanent magnet is magnetized in the axial direction.

2. A displacement sensor according to claim 1, wherein the diameter of an inner circumferential surface of the permanent magnet forming the central hole is substantially uniform, and the diameter of an outer circumferential surface of the permanent magnet decreases in one direction of the rectilinear movement.

3. A displacement sensor according to claim 1, wherein the diameter of an inner circumferential surface that forms the central hole decreases in one direction of the rectilinear movement, and the diameter of an outer circumferential surface of the permanent magnet is substantially uniform.

4. A displacement sensor according to claim 1, wherein the central hole is a through hole and is open at each of two ends.

5. A displacement sensor according to claim 4, wherein a radial dimension of the permanent magnet increases toward one end of the permanent magnet in the axial direction, such that the magnet has a large end and a small end, and the rate of increase of the radial dimension in the axial direction increases at locations closer to the large end of the permanent magnet.

6. A displacement sensor according to claim 1, wherein a magnetic member covers one end of the central hole.

7. A displacement sensor according to claim 1, wherein the central hole is circular in cross-section.

8. A displacement sensor according to claim 1, wherein said central hole has a center axis aligned on a center axis of the magnet.

9. A displacement sensor according to claim 1, wherein said magnet is circular in cross-section.

* * * * *